UNITED STATES PATENT OFFICE.

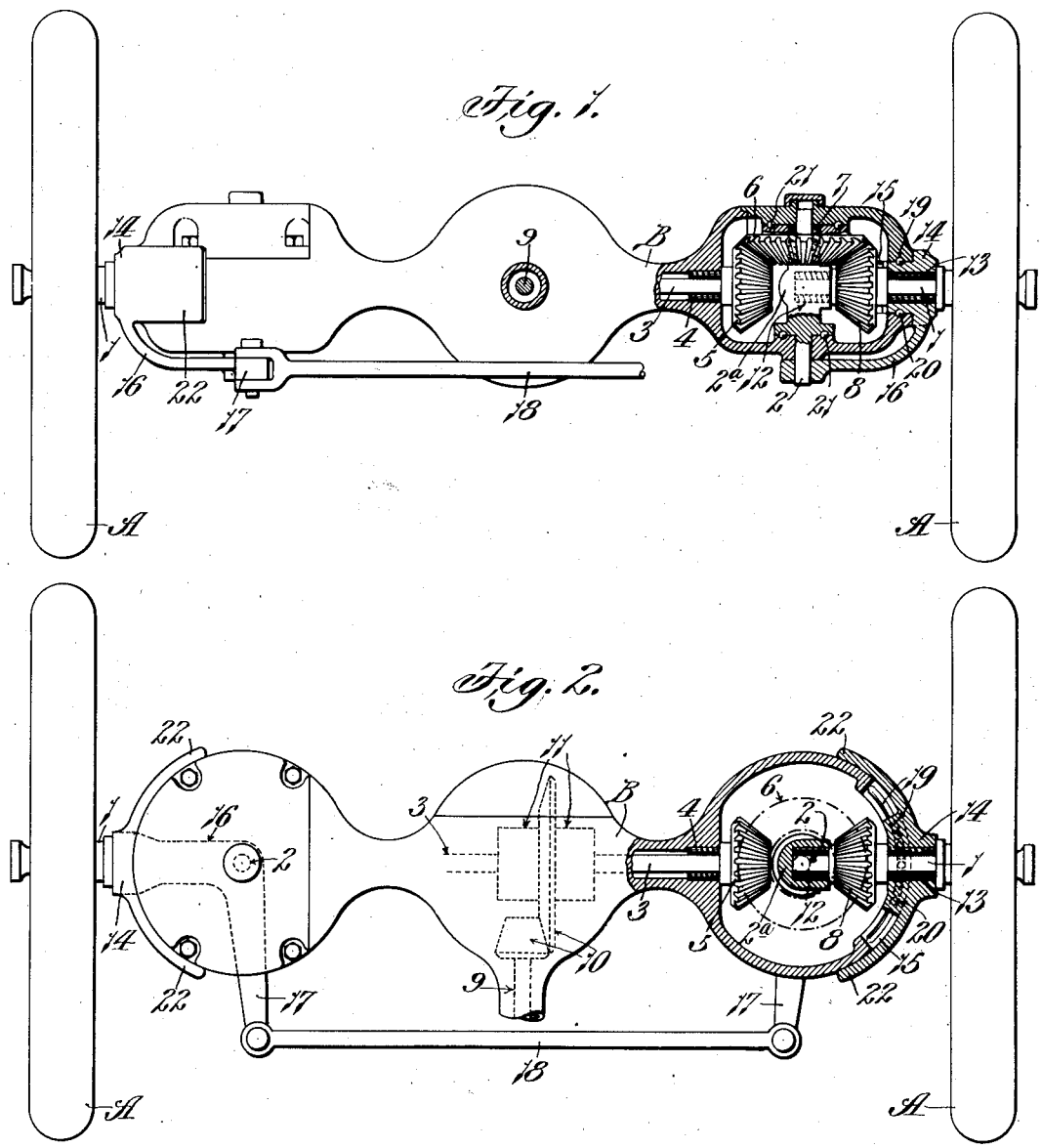

CLIFFORD H. YOUNG, OF ST. LOUIS, MISSOURI.

FRONT-WHEEL DRIVING MECHANISM FOR AUTOMOBILES AND SIMILAR VEHICLES.

1,259,950.  Specification of Letters Patent.  Patented Mar. 19, 1918.

Application filed April 7, 1917. Serial No. 160,387.

*To all whom it may concern:*

Be it known that I, CLIFFORD H. YOUNG, a citizen of the United States, residing at St. Louis, Missouri, have invented a certain new and useful Improvement in Front-Wheel Driving Mechanisms for Automobiles and Similar Vehicles, of which the following is a full, clear, and exact description, such as will enable others skilled in the art to which it appertains to make and use the same.

This invention relates to driving and steering mechanisms for automobiles and similar vehicles.

The main object of my invention is to provide an automobile with novel and efficient means whereby the motive power for propelling the same is applied to the front or steering wheels thereof, thus producing a vehicle having greater tractive power than the automobiles now in general use.

Another object is to provide an automobile of the character just referred to in which the front wheels, although used as driving wheels, still perform their usual function of swinging horizontally about a vertical, or substantially vertical, pivot to change the direction of travel of the vehicle. Other objects and desirable features of my invention will be hereinafter pointed out.

Figure 1 of the drawings is an elevational view, partly in vertical section, of a front wheel driving and steering mechanism constructed in accordance with my invention; and Fig. 2 is a top plan view, partly in horizontal section, of the mechanism shown in Fig. 1.

Referring to the drawings which illustrate the preferred form of my invention, A designates the front wheels of an automobile which are rigidly secured in any suitable manner to stub shafts or axles 1, each of said axles being carried by a vertical, or substantially vertical, pivot pin 2 that is journaled in the axle housing B which extends transversely between the wheels A.

The means for driving the wheels A preferably consists of a transverse shaft 3 mounted in suitable bearings 4 in the housing B and provided at each of its ends with a bevel pinion 5 which meshes with a bevel gear 6 that is rotatably mounted in a bearing 7 on one of the pivot pins 2, the axles 1 being provided with bevel pinions 8 which mesh with said bevel gears 6. When power is applied to the transverse shaft 3, the pinions 5 carried thereby will be rotated, revolving the bevel gears 6, which, in turn, transmit rotary movement to the axles 1, through the pinions 8.

It is immaterial, so far as my broad idea is concerned, what particular means is employed for applying motive power to the shaft 3, the means herein shown, however, consisting of a propeller shaft 9 leading from the motor (not shown) and connected to the shaft 3 by means of beveled gearing 10 and any suitable differential mechanism 11, as indicated in dotted lines in Fig. 2.

The inner end of each of the axles 1 is rotatably mounted in a bearing 12 arranged in an enlarged portion 2$^a$ of the pivot pin 2, and the intermediate portion of said axle is journaled in a bearing 13 arranged in a member 14, said member being slidingly mounted in an arcuate, horizontally-disposed slot 15 formed in the housing B concentric with the pivot pin 2. Each of the members 14 is provided with a portion 16 which extends downwardly and inwardly under the housing B and embraces the lower end of the pivot pin 2, said portions having angular, horizontally-disposed arms or extensions 17 to which are pivotally connected the usual reach rod or drag link 18 of the steering mechanism. It is obvious that when said link 18 is moved transversely of the vehicle by the steering mechanism (not shown) the members 14 will slide horizontally in the slots 15 about the pivot pins 2, and thus alter the position of the wheels A, so as to change the direction of travel of the vehicle. Owing to the fact that the axis of rotation of each of the axles 1 is coincident with the pivot pin 2 which carries the bevel gear 6, the pinion 8 on said axle will merely roll around the gear 6 whenever said axle is caused to move in an arc about said pivot pin.

Any suitable anti-friction devices may be employed between the members 14 and the walls of the slots 15 with which said members coöperate, in order to reduce wear and to facilitate turning of the wheel axles horizontally in one direction or the other. In the form of my invention herein shown I provide alining arcuate ball raceways 19 in said members and slot walls in which anti-friction balls 20 are arranged. Each of the pivot pins 2 is preferably provided with annular ball thrust bearings 21 which aid in reducing friction and undue wear of the mechanism.

In order to exclude dirt and other foreign matter from the interior of the housing B which incases the driving and steering mechanism previously described, I provide the members 14 with curved extensions or cover portions 22 which cover the slots 15 and extend beyond the edges of same far enough to completely cover said slots at all times, regardless of the position of the members 14 therein.

From the foregoing it will be seen that I have devised an efficient and practicable mechanism for driving and steering the front wheels of an automobile, said mechanism comprising a few simple parts which are not liable to get out of order and which are completely inclosed by a supporting and protective housing.

Having thus described my invention, what I claim, and desire to secure by Letters Patent, is:

1. An automobile driving and steering mechanism, comprising a supporting structure, a vertically-disposed pin journaled in said structure, a wheel carrying axle having its inner end journaled in said pin and its outer portion carried by a member that is slidingly mounted in a horizontally-disposed slot formed in said structure, means for moving said member in one direction or the other in said slot, and means for rotating said axle.

2. An automobile driving and steering mechanism, comprising a supporting structure, a vertically-disposed pin journaled in said structure, a wheel carrying axle having its inner end journaled in said pin and its outer portion carried by a member that is slidingly mounted in a horizontally-disposed slot formed in said structure, means for moving said member in one direction or the other in said slot, means on said member for completely covering said slot at all times, regardless of the position of said member in said slot, and means for rotating said axle.

3. An automobile driving and steering mechanism, comprising a supporting structure, a vertically-disposed pin journaled in said structure, a wheel carrying axle having its inner end journaled in said pin and its outer portion carried by a member that is slidingly mounted in a horizontally-disposed slot formed in said structure, means for moving said member in one direction or the other in said slot, anti-friction devices arranged between the contacting portions of said member and slot, and means for rotating said axle.

CLIFFORD H. YOUNG.

Copies of this patent may be obtained for five cents each, by addressing the "Commissioner of Patents, Washington, D. C."